United States Patent [19]

Cochran et al.

[11] Patent Number: 4,892,780
[45] Date of Patent: Jan. 9, 1990

[54] FIBER REINFORCEMENT FOR RESIN COMPOSITES

[76] Inventors: William H. Cochran, 1 Williams St., P.O. Box 32, Stonington, Conn. 06378; Brian P. Doyle, 3 Clifton Rd., Natick, Mass. 01760

[21] Appl. No.: 74,170

[22] Filed: Jul. 16, 1987

[51] Int. Cl.$^4$ .............................................. B32B 5/02
[52] U.S. Cl. .................................. 428/234; 428/246; 428/284; 428/300; 428/902
[58] Field of Search ............... 428/234, 300, 252, 253, 428/280, 282, 284, 296, 235, 902, 299

[56] References Cited

U.S. PATENT DOCUMENTS

| | | | |
|---|---|---|---|
| 3,122,444 | 2/1964 | Williams | 117/10 |
| 3,605,666 | 9/1971 | Kimmel et al. | 112/410 |
| 3,817,817 | 6/1974 | Pickens, Jr. et al. | 161/67 |
| 4,053,668 | 10/1977 | Kimmel et al. | 428/95 |
| 4,151,323 | 4/1979 | Christie | 428/234 |
| 4,154,335 | 5/1979 | Burnett et al. | 428/235 |
| 4,159,360 | 6/1979 | Kim | 428/234 |
| 4,190,695 | 2/1980 | Niederhauser | 428/234 |
| 4,284,680 | 8/1981 | Awano et al. | 428/234 |
| 4,342,802 | 8/1982 | Pickens et al. | 428/234 |
| 4,389,442 | 6/1983 | Pickens, Jr. et al. | 428/92 |
| 4,389,443 | 6/1983 | Thomas et al. | 428/92 |
| 4,390,582 | 6/1983 | Pickens, Jr. et al. | 428/85 |
| 4,391,866 | 7/1983 | Pickens, Jr. et al. | 428/92 |
| 4,426,421 | 1/1984 | Nakamae et al. | 428/234 |
| 4,504,538 | 3/1985 | Mussallem | 428/234 |
| 4,564,985 | 1/1986 | Tanabe | 428/300 |
| 4,749,613 | 6/1988 | Yamada et al. | 428/300 |
| 4,842,929 | 6/1989 | Dafour et al. | 428/300 |

Primary Examiner—James J. Bell
Attorney, Agent, or Firm—Cushman, Darby & Cushman

[57] ABSTRACT

A fiber reinforcement for resin-impregnated fiber composites wherein the reinforcement comprises a fibrous substrate having staple fiber applied to one or both sides by mechanical entanglement.

9 Claims, No Drawings

FIBER REINFORCEMENT FOR RESIN COMPOSITES

The present invention relates to improvements in fiber reinforcements for resin composites.

A wide variety of fiber reinforced resin composites is known. These include, for example, rigid composites comprised of fabric laminates which are impregnated with an appropriate resin such as epoxy, the resulting assembly being subsequently cured. While this type of composite can be used with advantage, various problems may arise when the composite is used. One particularly serious problem results from interlaminar shearing or separating which may occur between the various fabric layers.

The principal object of the present invention is to provide fiber reinforcements and composites of the type indicated whose overall properties are significantly improved. A particular object of the invention is to provide composites which are much more resistant to delamination, peeling or separation between fabric reinforcing layers. Other objects will also be apparent from the following description of various aspects and embodiments of the invention.

Broadly speaking, the composite of the invention is based on the concept of using, as the reinforcing textile layer or layers, a fibrous structure wherein staple fiber has been incorporated into a fibrous substrate by mechanical entanglement, notably by needle felting or processing on a needle loom, all hereinafter referred to as "needling", so as to provide a special form of "needled" fibrous structure. Stated otherwise, the composite of the invention is based on the use of one or more reinforcing fabric or fibrous layers which comprise a fibrous substrate having staple fibers applied to one or both of its sides by needle punching or other form of entanglement such as water or airjet entanglement.

According to one specific embodiment of the invention, the fibrous reinforcing layers are obtained by needling a web of high modulus, high molecular weight, highly oriented polyethylene fibers with, for example, staple acrylic fibers. This gives a fibrous structure with significantly improved properties in terms of stability and otherwise, as discussed later herein, with consequent improvements in composites made therefrom.

For present purposes, the starting substrate or web, from which the reinforcing needled layer is made, may have any desired structure and composition. Thus, the web may be a knit, woven, or nonwoven fabric and may comprise, in whole or part, high performance (e.g., high modulus, high strength) fibers, filaments or yarns, such as glass, acrylics, carbon, boron, polyethylene (e.g., the type known as "Spectra"), polyesters, including amorphous wholly aromatic polyesters, aromatic polyamides or polyimides such as "Kevlar", etc.

The staple fiber added to the web by entanglement according to the invention may be suitably chosen to give the desired properties to the final products. Thus, in broad terms, any kind of staple may be used including those mentioned earlier for the substrate, e.g., polyester, polyamide, polyethylene, glass, acrylic, carbon, boron fibers or the like.

The size of the staple selected for use in preparing the fibrous reinforcing structure, i.e., its length and diameter, can be widely varied. Typically, the fiber diameter is in the range of 0.5–15 microns and the fiber length varies from ¼–5 inches. However, it will be appreciated that fiber diameters and lengths outside these ranges may also be used.

The thickness of the initial substrate is not generally critical and, as indicated earlier, woven, knitted or nonwoven structures may be used. As a typical substrate, there may be mentioned a plain weave fabric comprising 17 Spectra or glass yarns per inch, in both warp and weft, although it will be appreciated that other similar or equivalent structures may be used. Filament wound, laid up filaments and conventional types of scrim, for example, may also be used as substrates.

The staple fiber add-on to the fibrous substrate may be accomplished through conventionally available fiber entanglement means, notably by needling or water/air pulse entanglement. These techniques are known in the art and may be effectively used for present purposes. The amount of staple fiber so added onto the web can be varied but generally will comprise from 5–200% by weight of the web. As noted, the staple add-on may be on one or both sides. In the case where the add-on is on both sides of the substrate, the same or different amounts and types of fiber may be used on each side depending on the ultimate use of the final product. Usually, however, the staple add-on is applied to both sides and in equal amounts.

It will be appreciated from the foregoing that the invention may be used to provide a variety of different types of surface properties on the textile substrate. For example, the surface of the substrate may be modified to improve or change adhesion, chemical affinity, abrasion resistance, color, ultraviolet stability, coefficient of friction, hand, etc. Mechanical stabilization, resistance to puncturing and other fabric improvements may also be provided.

A particular problem of some rigid composite laminates is "print through" of the reinforcing fabric to the surface of the laminate. This leaves a surface which is not smooth, but appears as an impression of the reinforcing fabric. The invention provides a method of preventing this "print through" in the smoothing effect of the add-on fiber. Also, the process of needling itself tends to smooth the surface of the substrate fabric. This smoothing can be enhanced by calendering or singeing the surface before laying-up the laminate.

The surface modification of the textile substrate should be selected to provide improvements in the overall properties of composites based on the indicated fibrous structures. Typically, interlaminar shear properties in rigid composites can be greatly improved using the surface-modified fabrics of the invention. However, other properties of resin impregnated fiber composite materials can also be improved using the invention. For example, control of density, or void fraction, and of resin/fiber ratio can be achieved through control of add-on, fiber size, amount and orientation and the degree and method of entanglement to control the ratio of add-on fiber on the surface to that in the body of the substrate. It is also possible to control the moduli of the composite by changing the Poisson's ratio of the material.

The specific fiber add-on, its color, its relative position in the resulting matrix, and/or its reason for being included (e.g., addition of some relatively low-density fiber to improve the impact resistance of a rigid composite made from the resulting textile matrix), may be varied to suit the circumstances of use.

Entanglement can be varied by changing needle size, type, spacing, line speed, and penetrations per square inch (PSI). It is also possible to control add-on fiber orientation through adjustments in the carding and lapping operations. Thus it is possible to adjust major fiber orientation in the X, Y, or Z direction.

In some cases filament loops and broken filaments may be caused to extend beyond the fiber bundle of the yarns comprising the substrate material during the needling or entanglement process. These filaments can function to hold the add-on fiber and to further entangle the reinforcing material.

Both the add-on fiber and yarn filaments displaced from the fabric substrate can, through capillarity, act to enhance resin flow into the reinforcing material. In some cases, for example, staple of a highly wettable fiber, such as a glass, might be needled into a substrate fabric formed from a fiber which is difficult to wet. Thus during resin application the staple fiber will enhance the flow of resin into the fabric of low wettability fiber. This modification of the resin flow properties can be advantageous both during primary resin application and secondary resin flow operations such as vacuum bagging.

Many of the improvements provided by the invention apply to flexible webs and composites as much as the rigid composites referred to. The modification of surface properties, when surface coatings are applied or not, can be particularly advantageous in flexible applications.

A further effect of the invention is to inhibit crack propagation through the resin contained in interstices between lamina and within coarse substrate fabrics. This is achieved through fiber reinforcement of these volumes of resin by filaments of the add-on staple and displaced fibers of the substrate yarn.

In one embodiment of the invention, the fibrous structure which is used to make resin-impregnated fiber composites according to the invention comprises a woven fabric or the equivalent made of "Spectra" fibers or the like needled with staple fibers. "Spectra" fibers are commercially available and are made from extended-chain, high modulus polyethylene of very high molecular weight, generally in the range of 1–5 million. The fibers are characterized by their high specific modulus strength, energy to break and abrasion resistance, electrical properties and chemical resistance, UV resistance and low moisture absorption. However, notwithstanding their many outstanding properties, "Spectra" fibers have certain disadvantages which significantly limit their uses. For example, woven fabrics as conventionally made from these fibers can be difficult to process or handle due to bias stretch or instability. The fibers have slippery surfaces and this makes handling difficult. Additionally, dyeing or doping is not possible, or is at least very difficult, and the fibers also appear to have less than optimum resistance to ultraviolet light. Coating of the Spectra fibers has been proposed as a way of dealing with one or more of the above problems. However, as far as is known, this has not been particularly successful. The combination of Spectra's low melting temperature and the difficulty of obtaining a good chemical bond to the polymer appears to limit coating as a practical solution to the indicated problems. Corona treatment appears to help somewhat with adhesion but there is still a need for significant improvement with respect to this property.

According to the invention, the problems encountered with fabrics based on Spectra or equivalent fibers can be dealt with, at least in part, by needle punching or by otherwise mechanically entwining selected staple fibers onto one or both sides of the fabric according to the invention. As noted earlier, the staple fibers can be appropriately chosen to provide the desired properties and characteristics in the final products without sacrificing any of the desirable features of the fabric substrate.

The invention is illustrated by the following examples wherein Examples 1–4 describe various needled fabrics suitable for use in making resin-impregnated fabric composites according to the invention while Examples 5–15 describe both the needled structures and composites made therefrom.

EXAMPLE 1

The substrate in this example is a 17 x 17 (yarns per inch) plain weave fabric weighing 5½ ounces per square yard woven from Spectra 900 polyethylene fiber (about 1200 denier). This fabric tends to distort and fray on handling.

The substrate is needled with 6 denier acrylic staple (about 1½ inches in length) to give an acrylic add-on of about 4½ ounces per square yard. The acrylic is equally distributed on both sides of the substrate. However, this is not necessary and the amount of staple add-on can vary to, for example, 80% on one side and 20% on the other side.

The resulting product demonstrates improved stability in handling, particularly in the elimination of fabric distortion when pulled on a bias widthwise. The product also shows improved ultraviolet resistance and surface adhesion for coating while retaining essentially all of the tensile strength of the original substrate. It is also noted that the coefficient of friction of the fabric surface is significantly changed. Thus, while the substrate or web per se is difficult to handle without significant weave distortion, due to lateral slippage of the web fibers with respect to each other, the acrylic-modified web can be mechanically fed into feed rolls or the like without distortion. The staple appears to lock or mechanically couple the warp and weft web yarns so that the latter are not able to move as freely as would otherwise be possible with the unmodified substrate.

EXAMPLE 2

A woven style 281 and comprising 17 yarns per inch of 1140 denier "Kevlar" type 49 in both warp and fill is needle felted with Owens-Corning Fiberglass staple glass fibers, (11 micron x 2" length E-glass fibers). The staple fiber add-on is about 3 oz. per square yard on each side of the substrate.

EXAMPLE 3

Example 2 is repeated except that the substrate is a crowfoot weave rather than a plain weave, with generally equivalent results.

EXAMPLE 4

A woven glass fabric (style 7781) comprising 57 yarns per inch of 75-I/0 E-glass in the warp and 54 yarns per inch of 75-I/0 E in the fill (8 harness satin, 8.95 oz/yd$^2$) is needle felted as in Example 1 with substantially the same staple add-on.

Needled fabrics, as illustrated in Examples 1–4, are uniquely suitable for use in making resin-impregnated composites (also referred to herein as textile reinforced resin composites). These composites may be of the rigid or flexible types and by appropriate selection of the nature and amount of staple fiber used, various desirable surface properties can be introduced to improve the overall performance of the substrate material and the composites obtained therefrom. Such properties as adhesion, chemical affinity, abrasion resistance, ability to dye or color, stability to ultraviolet light, coefficient of friction, hand, etc. can be modified and improved as needed. Improved interlaminar shear and resin wetting and saturation properties can be obtained in both flexible and rigid composites. Similarly mechanical coupling of surface resins, colorants, coatings and adhesives to the fibrous substrate can be markedly enhanced if this is deemed desirable.

Fabric stabilization and puncture resistance may be also noted among the many improved properties that can be realized by using the surface modification of the invention.

Conventional procedures may be used to make rigid resin composites according to the invention. For example, needled fabric may be impregnated with resin ("pre-preg") and then molded into the desired shape. Alternatively, one or more layers of the fabric may be placed in the mold initially and resin thereafter added so as to impregnate the fabric layers followed by curing. Typically suitable resins include epoxies, polyesters, polyetherether ketones (e.g., PEEK), polysulphones, etc. This aspect of the invention is illustrated by the following examples:

EXAMPLE 5

This example describes the preparation of a resin-impregnated fiber composite using epoxy resin and a woven carbon fiber fabric needled with E-glass staple fibers. The fabric is a T300 3K fabric comprising 12.5 yarns per inch in both warp and fill (plain weave, 13 mils thickness). This fabric is needled as in Examples 1–4 with Owens-Corning cardable E-glass filaments (2" x 11 microns) to provide a staple add-on of about 3 oz/yd$^2$. A 12-ply laminate of this fabric is impregnated in a suitable mold with Fiberite 934 epoxy resin. The fabric layers in the laminate are equally divided between 0°, +45°, −45° and 90° orientation. The impregnated laminate is autoclaved to cure to give a resin-fiber composite of highly useful properties.

EXAMPLE 6

Example 5 is repeated except that the epoxy resin is replaced by commercially available PEEK resin.

EXAMPLE 7

Example 5 is repeated except that the staple add-on by needling is about 2 oz/yd$^2$ of 1.5 denier x 2" Kevlar 49 fiber.

EXAMPLE 8

Example 5 is repeated except that the staple add-on is about 3 oz/yd$^2$ of a mixture of 50% 1.5 denier x 2" Kevlar 49 fiber and 50% 11 micron x 2" E-glass fiber.

EXAMPLE 9

This example illustrates the use of a modified Spectra fiber laminate to make a resin composite. The fibrous substrate is a Spectra 900 woven fabric (1200 denier) comprising 17 yarns/inch in both warp and fill in plain weave. The staple add-on by needling comprises Owens-Corning cardable E-glass staple (11 micron x 2"). The add-on is about 4 oz/yd$^2$. The composite comprises a 5-ply laminate of the needled Spectra fabric oriented at 0°, +45°, 90°, −45° and 0° using Araldite 6010 epoxy resin and HY956 hardener.

EXAMPLE 10

Example 9 is repeated except that the glass fabric of Example 4 is also used. The composite is prepared as a 5-ply laminate of 0° Spectra fabric, +45° glass fabric, 90° Spectra fabric, −45° glass fabric and 0° Spectra fabric.

EXAMPLE 11

This example describes the preparation of a composite using a glass quasi-isotropic laminate. The glass fabric is a Style 7781 E-glass 75 fabric comprising 57 yarns per inch warp, 54 yarns per inch fill, 8 harness satin and weighing 8.95 oz/yd$^2$. The staple add-on is Owens-Corning cardable E-glass filaments (1½" x 11 microns). The add-on is about 4 oz/yd$^2$. The resin is Epon 826. The composite is a 16-ply laminate with the plies divided equally between 0°, +45°, −45° and 90°.

EXAMPLE 12

This example describes a Kevlar 49 laminate. A composite is prepared using a style 500 Kevlar fabric (plain weave, 1420 denier) comprising 13 yarns per inch in both warp and fill. The fabric weighs 5.0 oz/yd$^2$. The staple add-on is Owens-Corning cardable E-glass filaments (2" x 11 microns). The add-on is about 3 oz/yd$^2$. Epon 826 epoxy resin is used to make a 7-ply laminate where the fabric is oriented at 0°, +45°, −45°, 0°, +45°, −45° and 0°.

EXAMPLE 13

Example 12 is repeated except that the staple add-on is 1.5 denier x 2" Kevlar 29 fibers.

EXAMPLE 14

A knitted carbon fiber laminate is prepared using Knytex style GCDB fabric (6K A54, 12 yarns/inch, knitted in 0°, +45°, −45°) with a staple add-on of Owens-Corning cardable E-glass filaments (2" x 11 microns, about 3 oz/yd$^2$ add-on) and Fiberite 934 resin. A 12-ply resin-impregnated laminate is prepared in this fashion.

EXAMPLE 15

A composite is prepared from a knitted glass fiber laminate. The knitted glass comprises Knytex style CDB 200 fabric prepared using 675 E-glass (11.3 yarns per inch). The orientation of the fabric is 0°, +45°, and −45°. The staple add-on is Owens-Corning cardable E-glass filament (2" x 11 microns, about 4 oz/yd$^2$). Fiberite 934 resin is used to complete the composite as a 12-ply laminate.

Various modifications may be made in the invention as described above. Hence the scope of the invention is defined in the following claims herein.

What we claim is:

1. A resin-impregnated fiber composite comprising a laminate of fibrous substrates each having staple fiber applied to one or both sides by mechanical entanglement, the substrates being impregnated with resin and the laminate being cured whereby the composite is characterized by improved interlaminar shear strength through the interlocking effect of the staple fibers applied by mechanical entanglement.

2. The composite of claim 1 wherein the staple fiber is applied to the fibrous substrates by needle punching.

3. The composite of claim 2 wherein the staple fiber is an acrylic staple and the fibrous substrates are high molecular weight, high modulus, highly oriented polyethylene.

4. The composite of claim 3 wherein the substrates are woven.

5. The composite of claim 1 wherein the substrates are woven, knitted or nonwoven.

6. A composite according to claim 1 which is rigid.

7. A composite according to claim 1 wherein the substrates comprise knitted or woven high molecular weight, high modulus, highly oriented polyethylene having acrylic staple applied to one or both surfaces by needle punching.

8. A composite according to claim 1 wherein the substrates are layered together before being impregnated and cured.

9. A composite according to claim 1 wherein the substrates are pre-impregnated and then layered together and cured.

* * * * *